(12) United States Patent
Vale et al.

(10) Patent No.: US 11,866,264 B2
(45) Date of Patent: Jan. 9, 2024

(54) CONVEYOR BELT MAINTENANCE SYSTEM

(71) Applicant: CONTINENTAL GLOBAL MATERIAL HANDLING LLC, Winfield, AL (US)

(72) Inventors: Shane Vale, Somersby (AU); Ryan Hubble, Somersby (AU)

(73) Assignee: Continental Global Material Handling LLC, Winfield, AL (US)

( * ) Notice: Subject to any disclaimer, the term of this patent is extended or adjusted under 35 U.S.C. 154(b) by 0 days.

(21) Appl. No.: 17/555,953

(22) Filed: Dec. 20, 2021

(65) Prior Publication Data

US 2022/0194711 A1 Jun. 23, 2022

Related U.S. Application Data

(60) Provisional application No. 63/128,657, filed on Dec. 21, 2020.

(51) Int. Cl.
| | |
|---|---|
| *B65G 15/60* | (2006.01) |
| *B65G 39/12* | (2006.01) |
| *B65G 21/10* | (2006.01) |

(52) U.S. Cl.
CPC ............. *B65G 15/60* (2013.01); *B65G 21/10* (2013.01); *B65G 39/12* (2013.01)

(58) Field of Classification Search
None
See application file for complete search history.

(56) References Cited

U.S. PATENT DOCUMENTS

| | | | | |
|---|---|---|---|---|
| 3,788,453 | A * | 1/1974 | Varney | A23N 3/00 226/14 |
| 3,827,365 | A * | 8/1974 | Coppel | B66C 13/12 104/127 |
| 7,950,520 | B2 * | 5/2011 | Mott | B65G 39/12 198/825 |

* cited by examiner

*Primary Examiner* — Kavel Singh
(74) *Attorney, Agent, or Firm* — Bradley Arant Boult Cummings LLP (57) ABSTRACT

A conveyor belt maintenance system and methods of use thereof are disclosed herein. The conveyor belt maintenance system comprises a support structure for supporting a portion of a belt of a conveyor the support structure comprising a frame, an idler roller supported on the frame, and one or more connectors coupled to the frame. The support structure further comprises a track coupled to the connectors. The idler roller is configured to engage and support the portion of the belt. The connector coupled to the track is configured to facilitate movement of the support structure along the track in a direction parallel to the belt of a conveyor.

16 Claims, 5 Drawing Sheets

CONVEYOR BELT MAINTENANCE SYSTEM

CROSS REFERENCE TO RELATED APPLICATIONS

This application claims priority to U.S. Provisional Patent Application Ser. No. 63/128,657, titled "Conveyor Belt Maintenance System" and filed on Dec. 21, 2020, the specification and drawings thereof are incorporated herein by reference.

FIELD OF THE INVENTION

The present disclosure generally relates to conveyor systems, particularly to conveyor systems for mining operations and more particularly to a system and method for servicing a belt for a conveyor system for mining operations.

BACKGROUND

A conveyor system (for example, in a longwall mining system) may include a face conveyor that transfers material cut from a mine face to a beam stage loader. The beam stage loader then transfers the cut material onto a boot end where the material is carried away by a main gate conveyor. The main gate conveyor carries the material via a belt. At various times, the belt may require maintenance, which may include replacing sections of the belt, replacing or reinforcing localized areas of the belt, and general inspection of the belt. Most commonly, the belt is maintained and removed as the main gate conveyor gets shorter due to progression of the longwall. Thus, there is a need for a conveyor belt maintenance system and method by which a conveyor belt can be maintained without removing the belt from the conveyor system. Additionally, there is a need for a conveyor belt maintenance system and method that allows a conveyor maintenance operator to safely perform maintenance away from the conveyor system thereby reducing the risk of injury to the maintenance operator.

SUMMARY OF THE INVENTION

The present disclosure describes a conveyor belt maintenance system and methods of use thereof. In one independent embodiment, a conveyor belt maintenance system comprises a support structure for supporting a portion of a belt of a conveyor, support structure comprising a frame, an idler roller supported on the frame, and one or more connectors coupled to the frame. The support structure further comprises a track coupled to the connectors. The idler roller is configured to engage and support the portion of the belt. The connector coupled to the track is configured to facilitate movement of the support structure along the track in a direction parallel to the belt of a conveyor.

In some embodiments, the conveyor belt maintenance system comprises a first and second connector connected to the frame of the support structure. The first connector is positioned on a first side of the frame and a second connector is positioned on a second side of the frame, the first connector and second connector facilitating translational movement of the frame parallel to the direction of travel of the belt of a conveyor system.

In another independent embodiment, a conveyor belt maintenance system includes a belt comprising a first portion and a second portion, wherein a first support structures includes a first frame comprising a first idler roller for supporting a first portion of the belt, and a second support structure includes a second frame comprising a second idler roller for supporting a second portion of the belt. The second idler roller is positioned below the first idler roller at a height less than a height of the first idler roller. The said second support is supported for translational movement of the second frame relative to the first frame parallel to a direction of travel of the belt. In other embodiments, the first frame is fixed and secured against movement.

In various embodiments, the conveyor system further includes a track, wherein a second support includes a connector engaging the track, the connector being movable along the track. In various embodiments, the track includes a first track and a second track parallel to the first track, wherein the connector is a first connector engaging the first track, the second support further including a second connector engaging the second track. In another embodiment, the connector includes at least one wheel rotationally engaging the track to facilitate movement of the second frame along the track in a direction parallel to the belt of the conveyor. In other embodiments, the conveyor system further includes an actuator coupled to the second support for moving the second support relative to the first support.

In yet another independent embodiment, a method for maintaining a belt for a conveyor system includes: clamping a first portion of the belt to fix the first end in a predetermined location; moving a belt support in direction parallel to the belt to increase a length of an unsupported portion of the belt; and advancing the belt to introduce slack in unsupported portion of the belt. In some embodiments, the step of moving the belt support includes operating an actuator (e.g., a winch) to move the belt support in a translational manner along a track.

Other embodiments of the disclosure and other features, aspects and advantages of the present disclosure will become better understood with reference to the following drawings, description, and claims.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Definitions

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. For brevity or clarity, well known functions or constructions may not be described in detail.

The terms "about" and "approximately" shall generally mean an acceptable degree of error or variation for the quantity measured in light of the nature or precision of the measurements. The terminology used throughout the disclosure is for the purpose of describing particular embodiments only and is not intended to be limiting. The singular forms "a," "an," and "the" are intended to include the plural forms as well, unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. The disclosure shows and describes only certain embodiments of the processes, machines, manufactures, compositions of matter, and other teachings disclosed; but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art. The embodiments described are further intended to explain certain best modes known of practicing the processes, machines, manufactures, compositions of matter, and other teachings of the disclosure and to enable others skilled in the art to utilize the teachings of the disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

Various embodiments of a conveyor belt maintenance system and method for servicing a belt for a mining conveyor system are described in this disclosure. Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
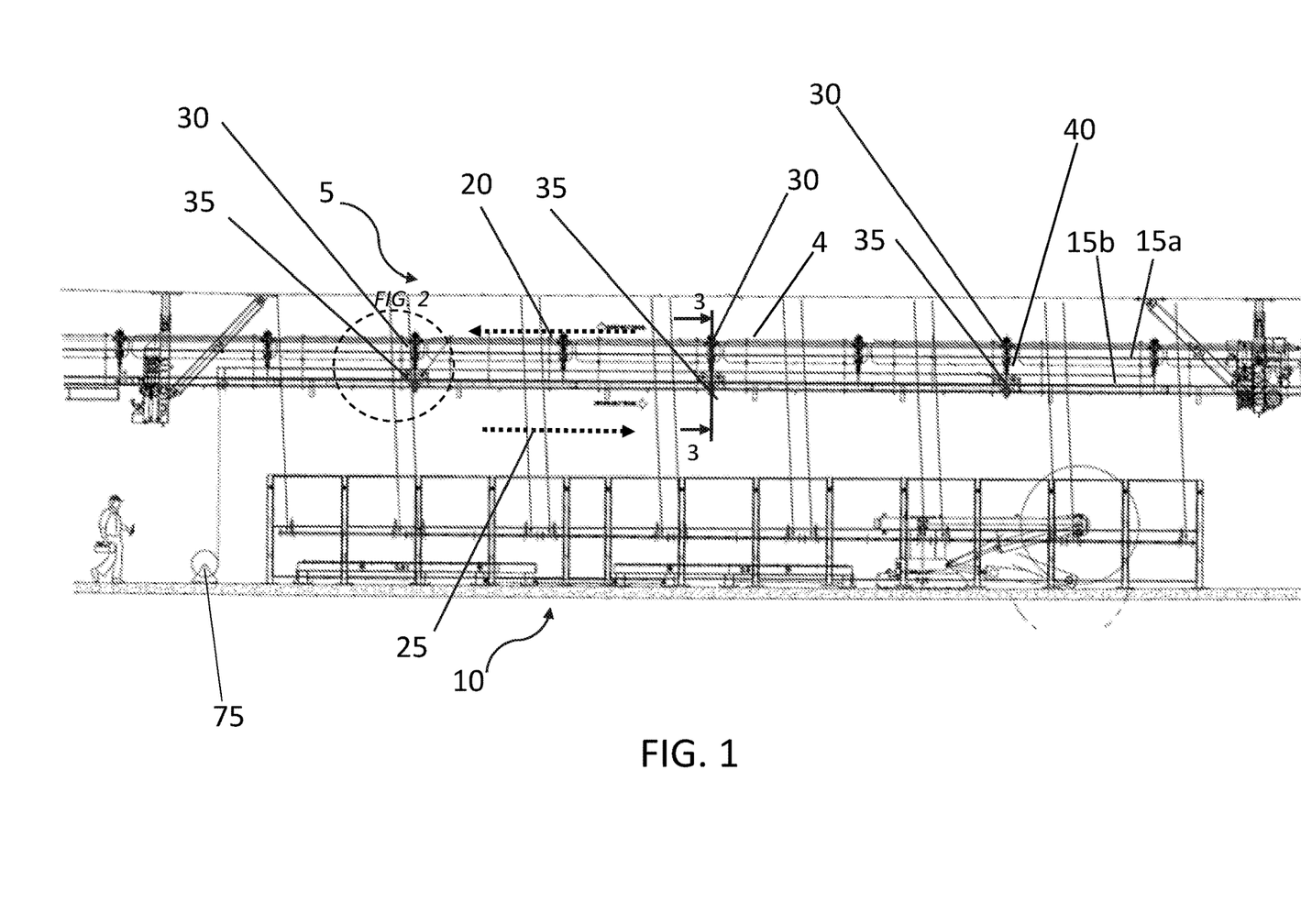
FIG. 1 is a side view of a conveyor belt maintenance system in an operation state, with one embodiment of the conveyor maintenance station positioned under a main gate conveyor.
Figure 4:
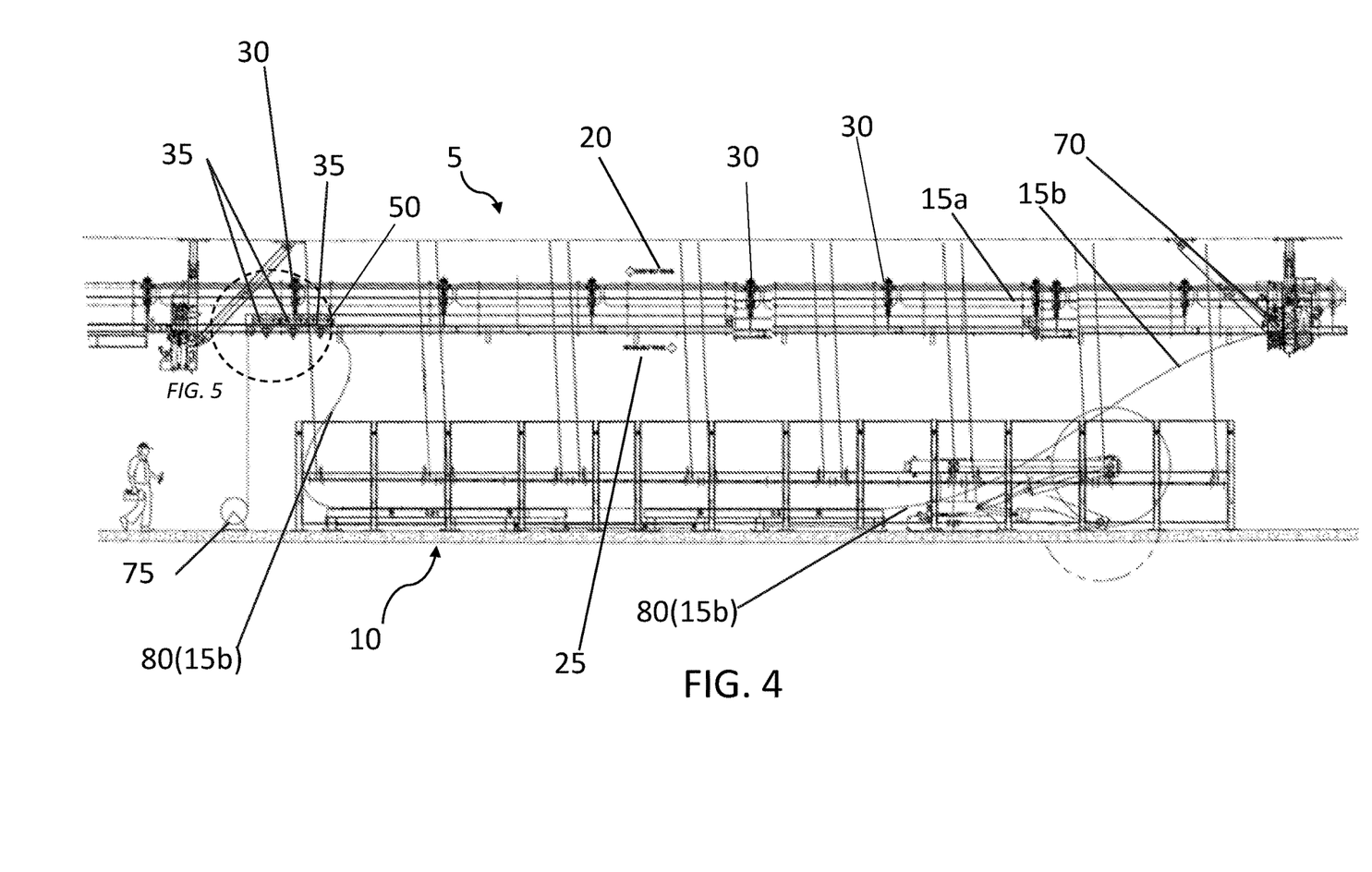
FIG. 4 is a side view of the conveyor belt maintenance system of FIG. 1 in a service state, with one embodiment of the conveyor maintenance station positioned under a main gate conveyor.

A conveyor system 5 as shown in FIGS. 1 and 4 may be used in a mining operation (e.g., a longwall mining operation). A mining machine (not shown) excavates material from a mine face of a mineral seam and progresses through the seam as material is removed. The structure and operation of the shearer may be readily understood by a person of ordinary skill in the art. In other embodiments, a different type of mining machine may be used. As the shearer removes material from the mine face, the cut material is directed onto a conveyor (e.g., a face conveyor), which transfers the cut material to one or more auxiliary conveyors (e.g., a beam stage loader, a main gate conveyor, etc.). In some embodiments, the cut material may pass through a sizer or crusher (not shown) before or after it is deposited on one of the auxiliary conveyors.

As shown in FIG. 1, a portion of a conveyor 5 conveys material generally away from the mine face in a carry direction 20 while the main gate conveyor 5 is in a normal operation state. In the exemplary embodiment, a continuous loop belt 15a, 15b carries the material away from the mine face in a carry direction 20. As the material is deposited or transferred at the end of the main gate conveyor 5, the return portion of the belt 15b returns to the mine face along the return direction 25 so that additional material can be loaded onto the belt 15a.

In the illustrated embodiment, the belt 15a, 15b extends in a continuous, endless loop between the mine face (not shown) and the end of the main gate conveyor 5. The continuous loop belt 15a, 15b includes a carry portion 15a (e.g., the upper portion) and a return portion 15b (e.g., a lower portion). The belt 15a, 15b, and the material supported thereon, is supported by a support structure 4. In the illustrated embodiment, the support structure 4 includes a plurality of fixed frames 30, and each frame 30 includes at least one idler roller 40 for engaging and supporting the belt 15a, 15b. In the illustrated embodiment, the frames 30 support the upper portion of the belt 15a. In other embodiments, the frame 30 supports both the upper and lower portion the belt 15a, 15b. In other embodiments, additional frames 30 support only the lower portion of the belt 15b.

As shown in FIG. 1, in an exemplary embodiment, the support structure 4 comprises a plurality of fixed frames 30 for supporting the upper portion of the belt 15a. The fixed frames 30 are secured and suspended from a ceiling of the mine 3 using a connection means, although a person skilled in the art will appreciate that the frames 30 can also be supported in another manner. In the exemplary embodiment, the support structure 4 further comprises a plurality of movable idler carriages 35 supporting a section of the lower portion of the belt 15b. In the exemplary embodiment, the moveable idler carriages are connected to a track 50, wherein the moveable idler carriages are moveable along the track 50 in a direction parallel to the direction of a belt 15a, 15b. In other embodiments, the moveable idler carriages 35 are connected to rails, wherein the moveable idler carriages are moveable along the rails.

Figure 2:
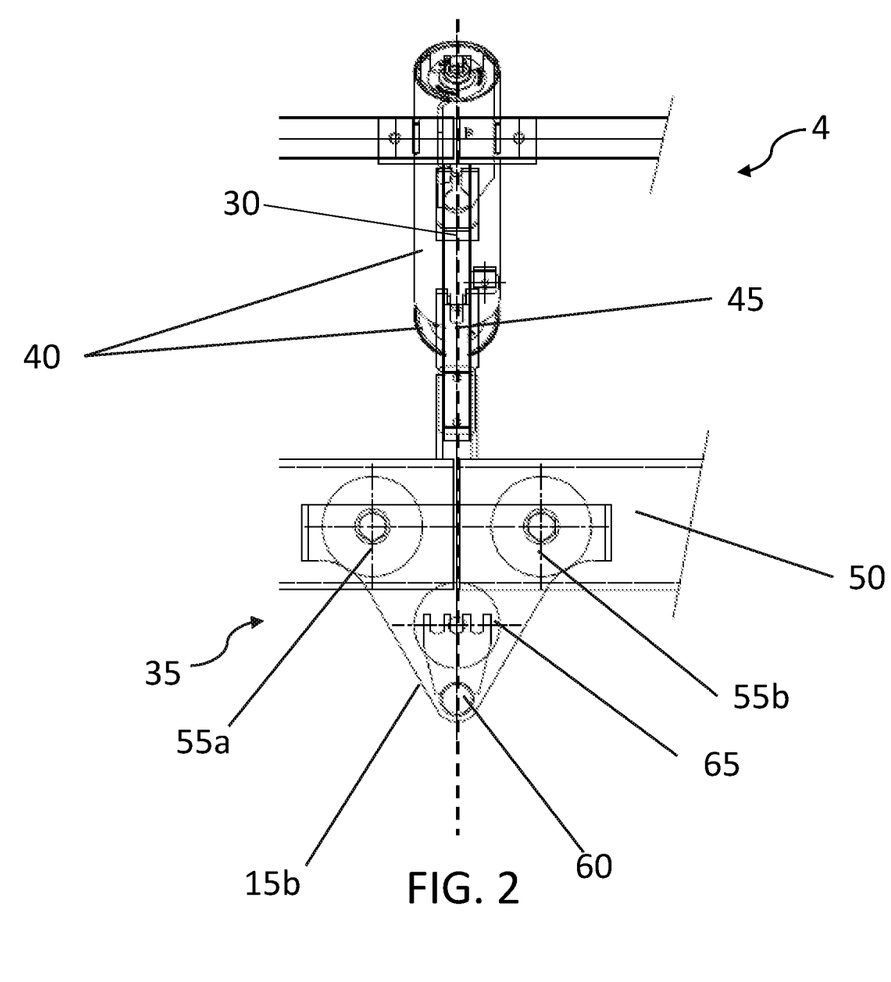
FIG. 2 is a detailed side view of a carriage and a return idler of one embodiment of the conveyor belt maintenance system of FIG. 1.

FIG. 2 illustrates an exemplary embodiment of a support structure of a conveyor belt maintenance system comprising a frame 30 including one or more idler rollers 40. In the exemplary embodiment, the support structure further comprises moveable idler carriages 35 supported on a track 50 positioned below the fixed frame 30. Advantageously, the moveable idler carriages 35 are detached from the fixed frames to facilitate movement of the moveable idler carriages 35 along the track 50 parallel to travel of the belt 15a, 15b. In other embodiments, the moveable idler carriages 35 are affixed to the track 50 and the frame 30 comprises wheels connected to the track 50 to facilitate movement of the track 50 along the wheels.

As shown in FIG. 2, the support structure 4 further comprises a track 50, wherein the moveable idler carriages 35 are supported by the track 50 by sliding support connectors. In the exemplary embodiment, the moveable idler carriages comprise a plurality of sliding support connectors 55 coupled to the track 50. In the illustrated embodiment, the moveable idler carriage 35 further comprises a suspended truss 60 and one or more idler rollers 65 engaging and supporting a return portion of the belt 15b of a conveyor. In the illustrated embodiment, the idler roller 65 is positioned laterally above the truss 60 to facilitate movement of the return portion of the belt 15b along the conveyor in a return direction. The idler rollers 65 being rotatable relative to the truss 60 about an axis that is oriented parallel relative to the longitudinal axis of the truss 60.

As shown in FIGS. 1 and 4, in various embodiments, the conveyor maintenance system further comprises an actuator 75 (e.g., a winch) coupled to a support structure for moving the moveable idler carriages 35 along the track conveyor system in parallel direction relative to the belt of a conveyor. In certain embodiments, the sliding support connectors of the moveable idler carriages include one or more wheels, drums, or pulleys tethered to the winch 75. In the illustrated embodiment, the moveable idler carriages 35 are tethered to a winch 75 by one or more wire, cables, or ropes wrapped around the winch drum. In the illustrated embodiment, the winch controls the movement of the moveable idler carriages 35. Moving the moveable idler carriages 35 towards the winch 75 increases the length of unsupported portion of the lower belt 15b. Conversely, moving the moveable idler carriages away from the winch 75 decreases the length of unsupported portion of the lower belt 15b. In certain embodiments, the winch 75 may reel in the cable to move the moveable idler carriages 35 in a parallel direction toward the winch 75. If the winch 75 pays out cable the moveable idler carriages is permitted to move along the tracks to maintained desired tension and support of the lower belt 15b.

As shown in FIG. 2, each side of the moveable idler carriage 35 comprises two sliding support connectors 55a, 55b engaging each of the conveyor tracks 50 for a total of four sliding support connectors. In other embodiments, fewer or more sliding support connectors 55a, 55b can be used (e.g., one sliding support connector 55 in each track 50, three sliding support connectors 55 in each track 50, etc.). The sliding support connectors 55a, 55b may be coated sliders or bearings or any other material that supports rotational movement along the track relative to the fixed frames 30.

Figure 3:
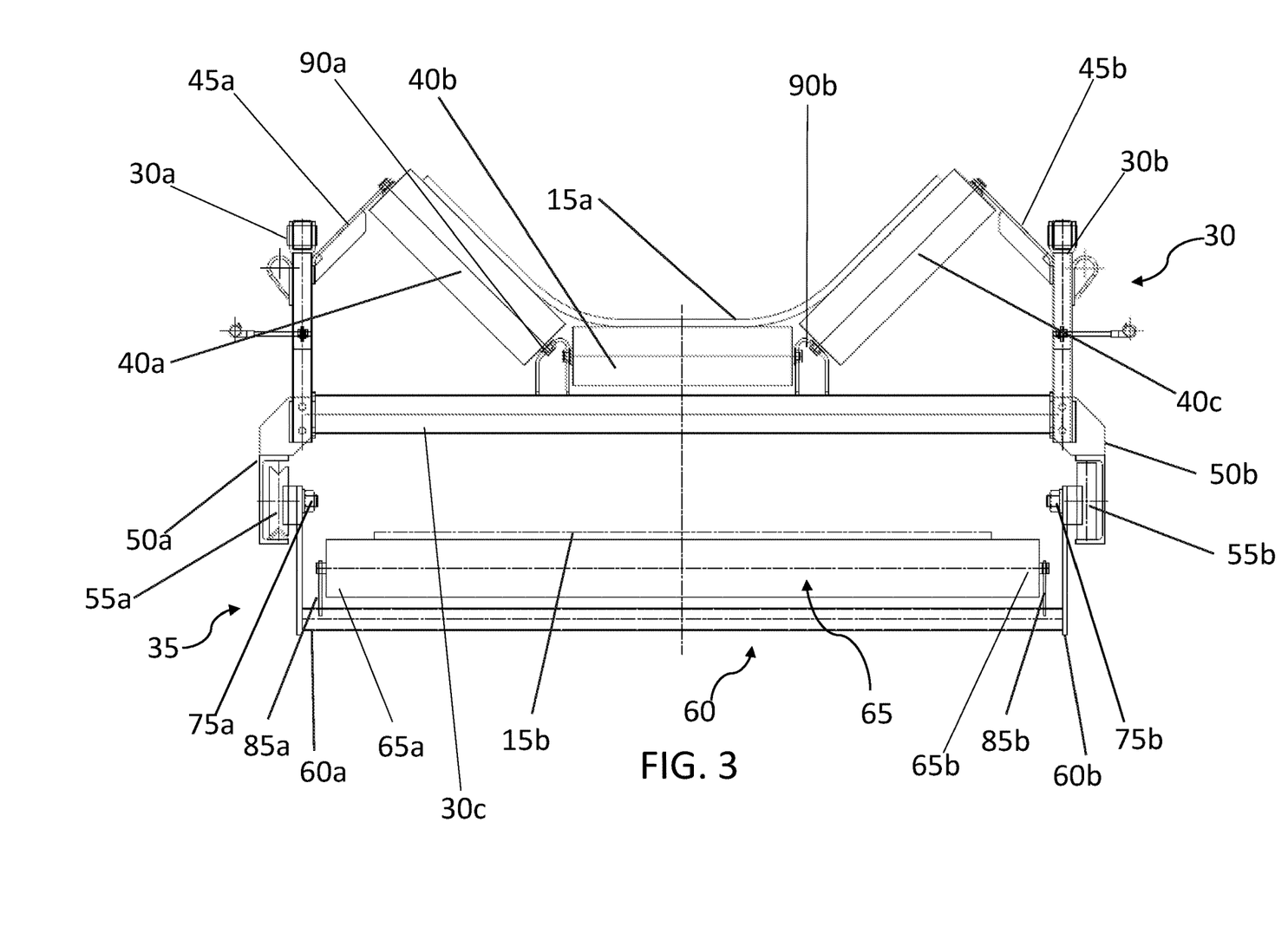
FIG. 3 is a section view of the conveyor belt maintenance system of FIG. 1, viewed along section 3-3.

FIG. 3 illustrates one embodiment of the fixed frames 30 for supporting an upper portion of the belt 15a. The fixed frame 30 comprises a base 30c, a first end 30a, and a second end 30b. In the illustrated embodiment the fixed frame 30 defines a longitudinal axis extending between a first end 30a and second end 30b of the frame. As shown, the fixed frame 30 includes three idler rollers 40 mounted between a first lateral support 45a and a second lateral support 45b, however, a person of ordinary skill in the art will understand the fewer or more idler rollers 40 may be used to support the upper portion of the belt 15a. In the illustrated embodiment, the belt 15a is located between the first and second ends of the fixed frame 30a, 30b, and the belt 15a is configured to move in a direction generally perpendicular to the longitudinal axis. The first and second ends of the fixed frame 30a, 30b are connectable to a surface (e.g., a ceiling).

With continued reference to FIG. 3, a plurality of idler rollers 40a, 40b, 40c are supported on the frame 30 between the first end 30a and second end 30b. In the illustrated embodiment, the idler rollers 40 are oriented in a U-shaped configuration to form a trough within which the carried material is supported. In the illustrated embodiment, a fixed frame 30 comprises a first idler roller 40a having a first end coupled to a first lateral support 45a and a second end coupled to a first support member 90a. The first lateral support 45b extends generally diagonally to the longitudinal axis of the base 30c of the frame 30 and is fixed to the first end of the frame 30a. As shown, a second idler roller 40b comprises a first end coupled to the first support member 90a and a second end coupled to a second support member 90b. The second support member 90b is coupled to the base 30c of the frame 30 and extends from the base 30c generally perpendicular to the longitudinal axis of the base 30c. A third idler roller 40c comprises a first end coupled to the second support member 90b and a second end coupled to a second lateral support 45b. The second lateral support 45b extends generally diagonally to the longitudinal axis of the base 30c of the frame 30 and is fixed to the second end of the frame 30b.

As shown in FIG. 3, the tracks 50a, 50b of the conveyor system are supported on a lower end of the fixed frame 30 coupled to first and second ends 30a, 30b. The tracks 50a, 50b extend transversely generally perpendicular to the longitudinal axis and parallel to the belt of a conveyor. In the illustrated embodiment, a first track 50a is coupled to a lower end of the first end of the frame 30a and a second track 55b is coupled to a lower end of the second end of the frame 30b.

With continued reference to FIG. 3, each moveable idler carriage 35 includes a frame member or suspended truss 60 and an idler roller 65 supported by a truss 60. The truss 60 has a first end 60a coupled to a first truss support member 75a connected to the first sliding support connector 55a and a second end 60b coupled to a second truss support member 75b connected to the second sliding support connector 55b. In the illustrated embodiment, the movable idler carriage 35 includes a single idler roller 65 comprising a first end 65a and a second end 65b in a horizontal orientation to support the return portion of the belt 15b. In the illustrated embodiment, the return portion of the belt 15b is located between the first and second ends of the idler roller 65a, 65b, and the belt 15b is configured to move in a direction generally perpendicular to the longitudinal axis of the idler roller 65. In other embodiments, the moveable idler carriage 35 may include fewer or more idler rollers 65 and may be oriented in a variety of different configurations including but not limited to a V- or U-shaped configuration.

As shown in FIG. 3, the idler roller 65 includes a first end 65a coupled to a first support member 85a and a second end 65b coupled to a second support member 85b. The first and second support members 85a, 85b extend generally perpendicular to the longitudinal axis and are fixed to the truss 60. The illustrated idler roller 65 is rotatable relative to the truss 60 about an axis that is oriented parallel to the longitudinal axis of the truss 60.

In the illustrated embodiment, the moveable idler carriage 35 is supported laterally below the fixed frame 30. In the illustrated embodiment, each of the idler carriages 35 includes one or more sliding support connectors 55 (e.g., a wheel) engaging a track 50 of the support structure. In the illustrated embodiment, the idler carriage 35 comprises a first support connector 55a engaging a first end of the track 50a and a second support connector 55b engaging a second end of the track 50b. As illustrated, the first support connector 55a is coupled to a first end of a truss 60a and second support connector is coupled to a second end of a truss 60b. The sliding support connectors 55a, 55b are coupled to a track 50a, 50b in a manner that inhibits disengagement with the tracks 50a, 50b, but the sliding support connectors 55a, 55b are movable along the track 50 (e.g., by sliding or rolling) to permit movement of the moveable idler carriage 35 along the conveyor system in a parallel direction relative to the fixed frames 30. The track may further comprise a V-shaped rail or linear flat surface rail. In the illustrated embodiment, the first track 50a includes a V-shaped rail. As shown in FIG. 3, the first sliding support connector 55a is a V-grooved or flanged wheel coupled to the V-shaped rail of the first track 50a to inhibit disengagement of the moveable idler carriage 35 from the track 50. and the second track 50b includes a linear surface rail for supporting the moveable idler carriage 35.

Figure 5:
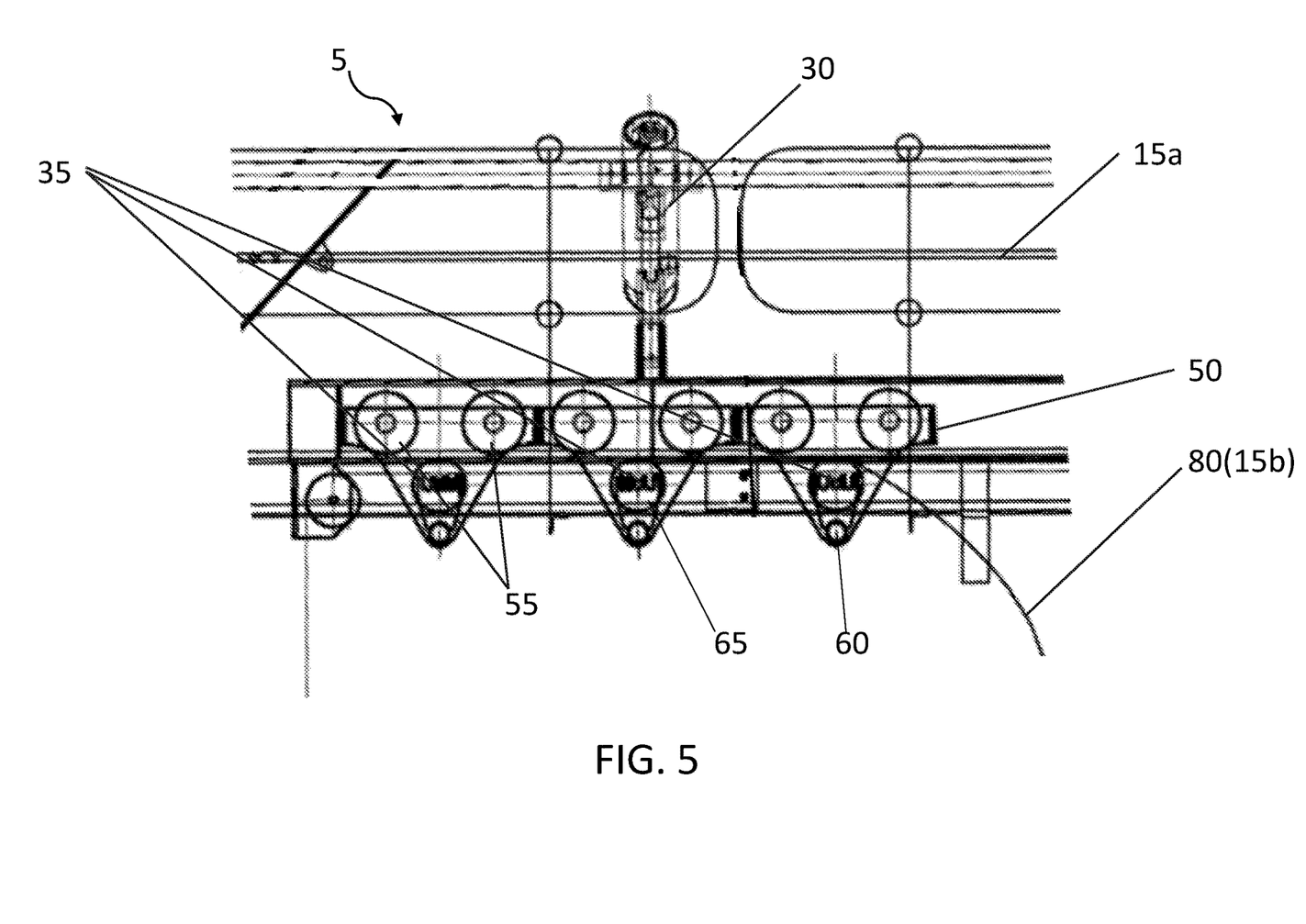
FIG. 5 is an enlarged side view of the idler roller carriages of the conveyor belt maintenance system of FIG. 4 in a retracted position.

FIG. 4 is an exemplary embodiment of the conveyor 5 in a maintenance state. In the illustrated embodiment, the moveable idler carriages 35 are tethered to a winch 75 by one or more wire, cables, or ropes. The winch controls the movement of the moveable idler carriages 35. As shown in FIG. 5, moving the moveable idler carriages 35 towards the winch 75 increases the length of unsupported portion of the lower belt 15b. Conversely, moving the moveable idler carriages away from the winch 75 decreases the length of unsupported portion of the lower belt 15b. In the illustrated embodiment, the moveable idler carriages 35 are in the retracted position towards the carry position of the conveyor 5 creating an unsupported section of the lower belt 15b. In the illustrated embodiment, the conveyor 5 comprises a clamping system 70 for clamping a section of the belt 15 in a predetermined location, thereby creating slack in the unsupported portion 80 of the belt 15b. The slack causes the unsupported portion 80 to move downwardly away from the operating position. In the illustrated embodiment, the slack portion 80 drops into an area of the belt maintenance station 10 where the belt 15a, 15b can be safely and conveniently handled by one or more operators at a distance away from the conveyor system 5

FIG. 5 is a detailed view of one embodiment of three moveable idler carriages 35 moved along the track 50 of the conveyor system 5 to the retracted position. In the exemplary embodiment, the three moveable idler carriages 35 are positioned adjacent to one another and laterally below a fixed frame 30, which has not moved relative to the other components of the conveyor system 5. In various embodiments, fewer or more moveable idler carriages 35 may be used. As shown in FIG. 5, when the moveable idler carriages 35 are moved along the track 50a, 50b to the retracted position, a section of the return portion of the belt 15b becomes unsupported by the idler rollers 65 of the moveable idler carriages 35 thus forming a slack portion 80 of the return portion of the belt 15b. Advantageously, the slack portion may be positioned on a conveyor maintenance station 10 (FIG. 4) wherein a maintenance operator may conduct maintenance on a section of the belt 15a, 15b away from the main conveyor system 5.

In another independent embodiment, the conveyor belt maintenance system 5 comprises a belt 15a, 15b and a first support structure and second support structure. The first support structure comprises a first frame further comprising a first idler roller for supporting a first portion of the belt 15a, and a second support structure comprising a second frame further comprising a second idler roller for supporting a second portion of the belt 15b, and a track 50 for supporting movement of the second idler roller along the track 50, wherein the first frame is secured against movement. The second support structure is positioned parallel to and laterally below the first support structure at a height less than a height of the first support structure. Wherein the second support structure is supported for movement of a second idler roller along the track 50 relative to the first support structure parallel to a direction of travel of the belt 15a, 15b.

In still other embodiments, a method for maintaining a conveyor belt is provided. The meth including operating a conveyor belt maintenance system 5 to position a portion of the belt 15a, 15b that requires servicing adjacent to the belt maintenance station 10. In the illustrated embodiment, the belt maintenance station is positioned parallel to and laterally below the conveyor 5. In the illustrated embodiment, a clamp 70 secures a return portion of the belt 15b (i.e., a portion supported by the idler carriage(s) 35), and one or more moveable idler carriages 35 are moved from their operating position (as shown in FIG. 1) to a retracted or service position (as shown in FIG. 4). An actuator 75 (e.g., a winch) is operated to move the idler carriages 35 in a direction parallel to the direction of the belt of the conveyor along the track 50, which extends transversely parallel to the belt of a conveyor, toward the retracted position as shown in FIG. 4, thereby creating an unsupported portion of the lower portion of the belt 15b.

As shown in FIG. 4, in the illustrated embodiment, the actuator 75 (e.g., winch) is positioned toward the carry position 20 away from the mine face (not shown) and adjacent to the maintenance station 10. In the illustrated embodiment, the winch 75 controls the movement of the moveable idler carriages 35. Moving the moveable idler carriages 35 towards the winch 75 (positioned toward the carry position 20) increases the length of unsupported portion of the lower belt 15b. After the moveable idler carriages 35 have been moved to the retracted position, the conveyor 5 may be operated to move the belt 15a, 15b toward the portion of the belt 15a, 15b that is clamped by the clamping system 70 thereby creating slack in the unsupported portion 80 of the belt 15b. The slack causes the unsupported portion 80 to move downwardly away from the operating position. In the illustrated embodiment, the slack portion 80 drops into an area of the belt maintenance station 10 where the belt 15a, 15b can be safely and conveniently handled by one or more operators at a distance away from the conveyor system 5.

After maintenance of the belt 15a, 15b is complete, the conveyor system 5 may be operated in a reverse direction (i.e., a return direction 25) to remove the slack in the unsupported portion of the belt 80, the actuator (e.g., winch 75) is actuated to return the moveable idler carriages 35 to their operating positions (as shown in FIG. 1), and the clamp(s) 70 are deactivated. Thus, the belt 15a, 15b is returned to a taut position and the conveyor system 5 may resume normal operations.

Advantageously, among other things, the movable idler carriages 35 reduce the risk of operator harm (e.g., caused by working near a loaded belt 15a, 15b and other components of the conveyor system 5) by permitting operators to efficiently remove and/or repair sections of the belt 15a, 15b at a location away from the rest of the conveyor system 5 without requiring significant additional time or effort.

Although embodiments have been described in detail with reference to certain preferred aspect, embodiments, variations, and modifications exist within the scope and spirit of one or more independent embodiments as described.

Various features and advantages of the invention are set forth in the following claims.

What is claimed is:

1. A maintenance system for a belt of a conveyor comprising:
   an upper support structure, wherein said upper support comprises:
      one or more frames, each frame comprising a first end, a second end, and at least one idler roller supported between the first and second ends for supporting an upper portion of said belt;
   a lower support structure, wherein said lower support comprises:
      one or more moveable idler carriages, each moveable idler carriage including at least one idler roller for supporting a lower portion of said belt and a plurality of support connectors; and
   a track connected to the upper support structure, wherein said plurality of support connectors moveably engage said track to facilitate movement of the one or more moveable idler carriages along the track in a direction parallel to the direction of said belt.

2. The system of claim 1, wherein each frame of said upper support structure comprises:
   a first idler roller including a first end coupled to a first lateral support and a second end coupled to a first support member;
   a second idler roller including a first end coupled to said first support member and second end coupled to a second support member;
   a third idler roller including a first end coupled to said second support member and a second end coupled to a second lateral support.

3. The system of claim 1, wherein the track is connected to said one or more frames and extends parallel to said belt.

4. The system of claim 1, wherein said upper support structure is affixed to a ceiling and said track is affixed to said ceiling.

5. The system of claim 1, wherein each moveable idler carriage further comprises a truss, and wherein the at least one idler roller of each moveable idler carriage is positioned laterally above the truss.

6. The system of claim 5, wherein each moveable idler carriage further comprises one idler roller including a first end coupled to first support member and a second end coupled to a second support member, wherein the first and second support members are fixed to the truss and extend generally perpendicular to the longitudinal axis of the truss.

7. The system of claim 1, wherein the support connectors comprise at least one wheel engaging the track to support movement of the moveable idler carriages along the track.

8. The system of claim 1, further comprising:
   an actuator coupled to the lower support structure to facilitate moving the lower support structure along the track, the actuator including a winch drum and a cable wrapped onto the winch drum.

9. A system for maintaining a belt of a conveyor comprising:
   a first support structure comprising:
      a first frame including a first end and second end; and
      a first idler roller connected to said first frame for supporting a first portion of said belt between the first and second ends of the first frame;
   a second support structure comprising:
      a second frame including a first end and second end; and
      a second idler roller connected to said second frame for supporting a second portion of said belt between the first and second ends of the second frame; and
   a track, wherein said second frame is moveably coupled to said track to facilitate movement of the said second support structure along the track in a direction parallel to said belt.

10. The system of claim 9, wherein the first frame is secured against movement.

11. The system of claim 9, further comprising an actuator coupled to the second support structure for moving the second support structure along said track in a direction towards said first support, the actuator including a winch drum and a cable wrapped onto the winch drum.

12. The system of claim 9 further comprising a second track parallel to said track.

13. The system of claim 12, wherein the second support structure further comprises a first connector engaging said track and a second connector engaging said second track.

14. A method of conducting maintenance on a belt of a conveyor, comprising:
   moving at least one support structure that is supporting a portion said belt in a direction parallel to the belt to increase a length of an unsupported portion of a belt; clamping the belt at a predetermined location along the return path of the conveyor; operating the conveyor in a carry direction toward the portion of the belt that is clamped to introduce slack in the unsupported portion of the belt; lowering the slack portion of the belt into an area of a belt maintenance station; and performing maintenance on the slack portion of the belt.

15. The method of claim 14 further comprising:
   the moving step including actuating an actuator to move one or more belt supports in a direction parallel to the belt.

16. The method of claim 14, further comprising:
   operating the conveyor in a reverse direction to remove slack in the unsupported portion of the belt; and
   returning the at least one support structures to their original positions to decrease the length of the unsupported portion of the belt.

* * * * *